JOHN DIMEFF
JAMES W. LANE
INVENTORS

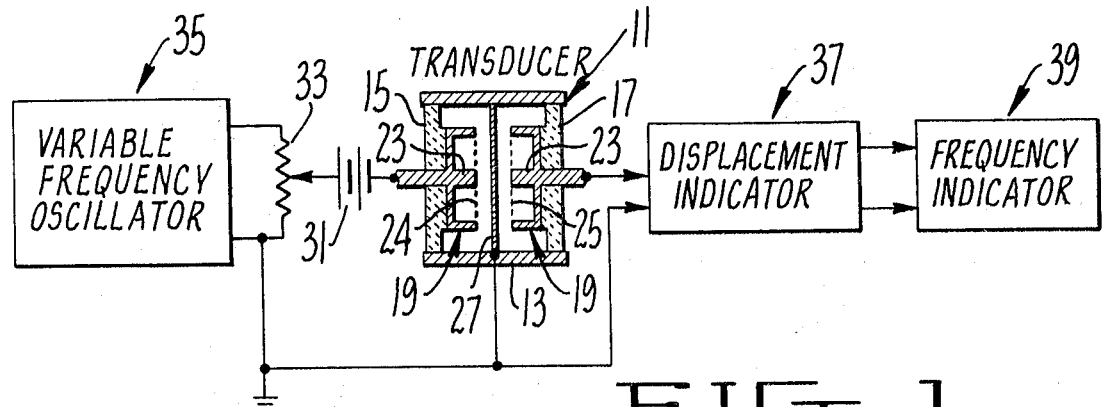
FIG. 1.
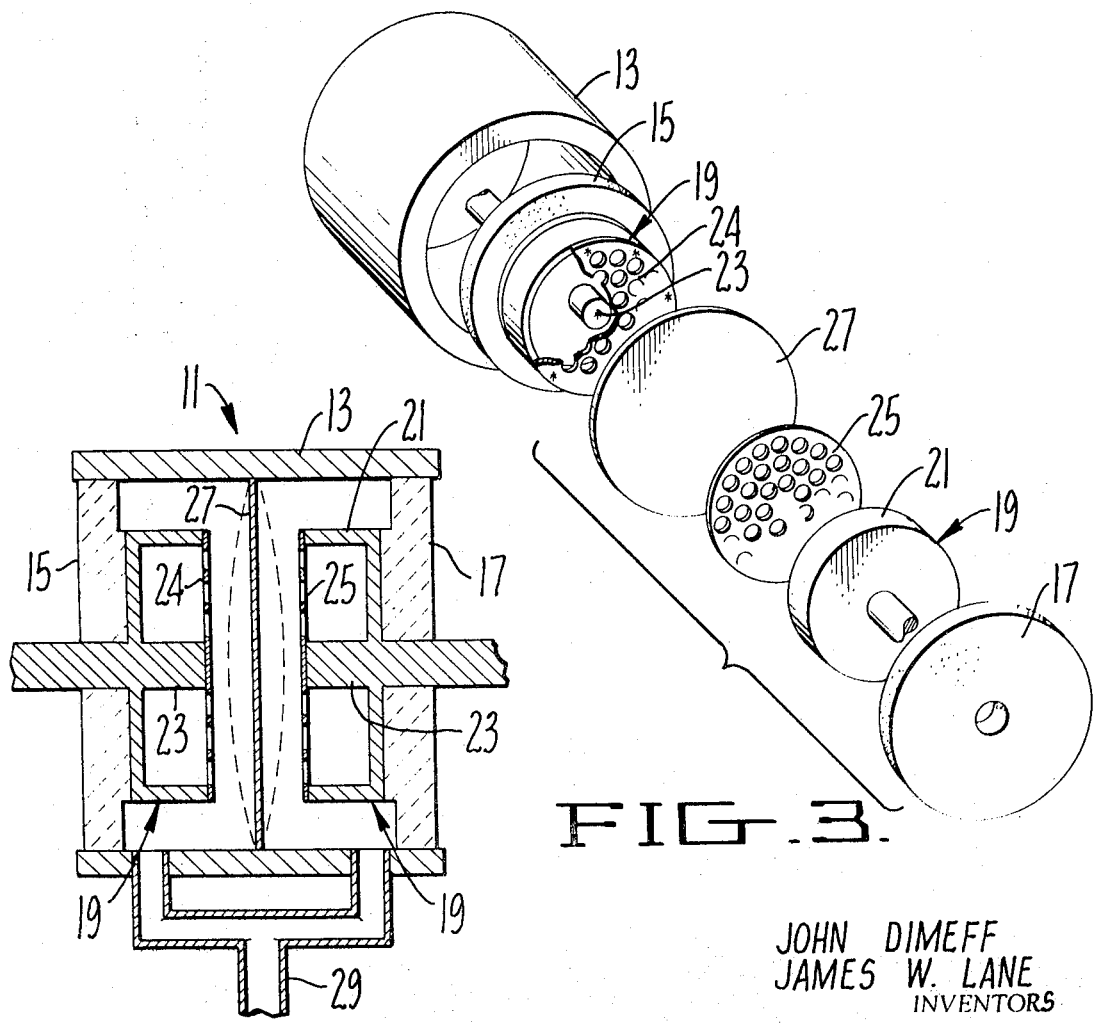
FIG. 2.
FIG. 3.
JOHN DIMEFF
JAMES W. LANE
INVENTORS

BY
ATTORNEYS

United States Patent Office 3,620,083
Patented Nov. 16, 1971

3,620,083
WIDE RANGE DYNAMIC PRESSURE SENSOR
John Dimeff, San Jose, and James W. Lane, Sunnyvale, Calif., assignors to the United States of America as represented by the Administrator of the National Aeronautics and Space Administration
Filed Dec. 4, 1969, Ser. No. 882,122
Int. Cl. G01i 9/12
U.S. Cl. 73—398 C
4 Claims

ABSTRACT OF THE DISCLOSURE

A dynamic pressure sensor of the type wherein a diaphragm is provided in a cavity with a driving plate on one side of the diaphragm and a sensing plate on the other side of the diaphragm wherein the driving and sensing members are perforated and spaced from the walls of the cavity so that damping and apparent stiffness increase induced by increased pressure are reduced. By reducing the damping and apparent stiffness, the range of the instrument is greatly increased so that it can be used for measuring high and low pressures.

---

The invention described herein was made by employees of the United States Government and may be manufactured and used by or for the Government for Government purposes without the payment of any royalties thereon or therefor.

BACKGROUND OF THE INVENTION

Field of the invention

A device for measuring density and/or pressure of a gaseous environment wherein a vibrating diaphragm transducer is employed.

Description of the prior art

The closest known prior art is a patent of one of the present inventors, U.S. Pat. No. 3,295,360. In said patent, a transducer is employed having a diaphragm or other vibrating member at the center thereof with a driving plate on one side of the diaphragm and a sensing plate on the other. The vibrating member is driven at its resonant frequency by induced electrostatic forces applied between the vibrating member and a stationary unit in close proximity to one side of the vibrating member. A sensing member is used on the opposite side of the vibrating member with an appropriate feedback circuit to maintain resonance. The driving energy required to keep the system oscillating at a fixed amplitude is measured and the energy is related as a function of pressure or density to the pressure or density of the gas in the chamber. Alternately, the frequency of resonance can be measured as the resonant frequency is a function of gas pressure or density.

The device described in said patent is a substantial improvement over prior art devices and performs adequately for many purposes. However, when one attempts to measure higher pressures, the damping increases with pressure because of the small distance between the forcing and sensing plates causing the moving member to do substantial work on the gas being tested. This increased damping with increasing pressure causes the sensor to cease to be a simple mechanical resonant system so that the device is not capable of making pressure measurements over about 1000 torr. This apparent stiffness of the diaphragm also increases more rapidly than would be desirable because of the gas loading and thus the frequency changes radically as the gas stiffness increases. The system no longer responds to increase in pressure and at a pressure of about 100 torr the system tends to lock in on an acoustical mode and a frequency reversal occurs so that any further increase in pressure causes further decreases in the system frequency and the system tends to operate in an acoustic mode. Thus, such systems cannot be used above about 1000 torr and become undesirable even above 100 torr.

In accordance with the present invention, the above disadvantages of the prior art structure are obviated by replacing the solid sensing and forcing plates of the prior art with metallic sensing and forcing grids having at least 40% open area, said grids being spaced inwardly from the walls of the chamber. The porous grids enable the vibrating diaphragm to "see" larger gas chambers with reduced damping characteristics so that it is entirely feasible to make pressure measurements as high as 5000 torr.

SUMMARY OF THE INVENTION

The present invention relates to a vibrating diaphragm transducer and will be largely described in terms of a pressure sensing device. However, as will be apparent to those skilled in the art, the device is of broad applicability and can be used in various instruments wherein diaphragm motion is sensed by a variation of capacitance as in dynamic capacitors, electrometers, mechanical filters and the like. Further, the device is applicable to instruments wherein the diaphragm is not driven in a steady state motion as for instance, where the diaphragm is excited by shock, vibration or acceleration with the sensing accomplished by capacitance with the unwanted higher modes suppressed by utilizing the technique of the present invention.

In U.S. Pat. No. 3,295,360, a dynamic sensor is described and claimed for measuring the transformation of physical forces into mechanical/electrical responses. This can be utilized for measuring the forces involved and, in particular, for measuring the density of a gaseous environment or, under conditions where the composition and temperature are known, the device which will measure the pressure of the gaseous environment. In accordance with said disclosure, a vibrating member, normally a thin, metallic diaphragm is maintained at a constant vibrational amplitude at its resonant frequency with the gas whose pressure or density is to be measured surrounding the diaphragm. A driving plate is provided on one side of the vibrating member which drives the vibrating member through electrostatic forces and on the other side of the diaphragm a sensing plate is provided with a suitable feedback circuit to maintain resonance and keep the amplitude or the vibrating member constant. Means are provided for measuring the energy required to keep the system oscillating at a constant amplitude and this is a measure of the work done in overcoming the losses associated with the motion and compression of the gas. In such a system, as the density of the gas increases, resistance of the gas to compression and expansion increases much as if a strain were placed on the vibrating member which would tend to resist the motion of the vibrating member. Thus, the gas tends to increase the effective stiffness of the dynamic system and has the effect of increasing the mass of the dynamic system. With the geometry employed, utilizing fixed forcing and sensing plates, which normally form the walls of the cavity surrounding the diaphragm, the damping increases with increasing pressure more rapidly than is desirable so that the sensor ceases to function as a simple mechanical resonant system and is not capable of making pressure measurements in a range above 1000 torr. The stiffness also increases more rapidly than is desirable and hence, the frequency changes radically which at pressures above approximately 100 torr may cause the mechanical frequency of the diaphragm due to the gas stiffness to overlap with an acoustic resonance associated with the geometry of the transducer cavity formed by the diaphragm, fixed electrodes and the interior dimensions of the transducer body. When pressure measurements are made with the system of the prior art, the mechanical Q (measure of the system's relative energy loss) diminishes with increasing pressure and, when it is sufficiently low, the system no longer responds to an increase in pressure. Further, at pressures above approximately 100 torr the system tends to lock in on an acoustical mode and a frequency reversal occurs so that further increases in pressure cause further decreases in the system frequency and it thus becomes unfeasible to utilize the prior art transducer embodiment for pressure measurements in excess of 1000 torr and undesirable to utilize such a system above 100 torr.

In accordance with the present invention, the transducer has been improved by substituting a metallic sensing grid and a metallic forcing grid having approximately 40% open area. These grids are spaced from the walls of the cavity.

Further, in accordance with the present invention, construction materials can be used which enable the transducer to be sterilized at high temperatures. The configuration is such that it is easy to design a device which is completely operable as high as 5000 torr. The combination of sterilization ability and ability to measure high and low pressures makes it ideal for use as a planetary probe such as a Venus probe.

Additionally, the device of the present invention has been found to have less gas composition sensitivity than devices heretofore known. Also, it is relatively free from undesirable acoustic resonances.

I preferred embodiments of the invention, the effects of undesirable diaphragm motion in a higher Bessel mode can be readily suppressed as is set forth later in detail.

Other features of the invention will be apparent from the description of the preferred embodiments.

BRIEF DESCRIPTION OF THE DRAWINGS

FIG. 1 is a cross section of a simplified embodiment of the present invention showing the transducer in a cross section (not scale) together with a simplified schematic representation of an apparatus for sensing the dynamic properties of the vibrating diaphragm.

FIG. 2 is an enlarged cross section of the transducer element of FIG. 1.

FIG. 3 is an exploded perspective view of the transducer shown in FIG. 1.

DESCRIPTION OF THE PREFERRED EMBODIMENTS

Figure 4:
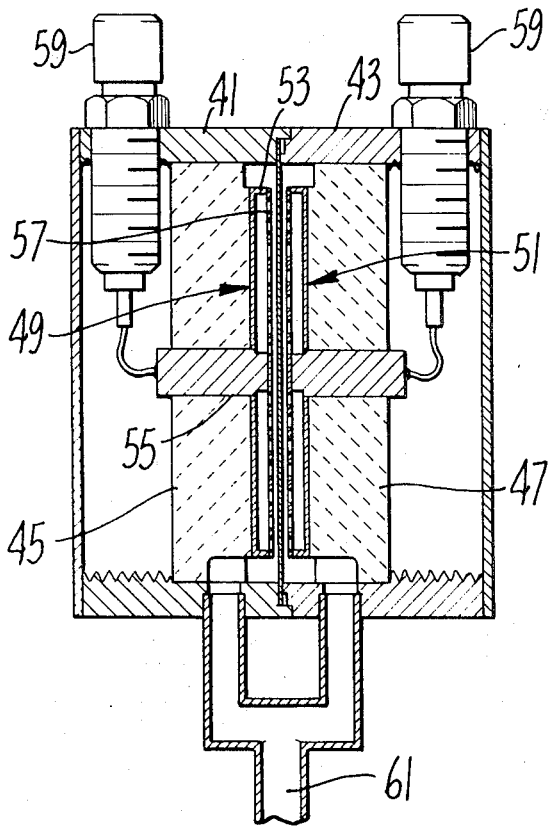
FIG. 4 is a cross section of a transducer showing a practical embodiment of the present invention.

The present invention has many features in common with U.S. Pat. No. 3,295,360 and in general can be used for the same purposes and with the same electronic circuitry. In the description of the preferred embodiments, therefore only those features of the present invention which differ from said patent will be described in detail.

In general, the present invention differs from the prior art in that instead of using solid plates, a screen or grid is used for driving and sensing with the grid or plate elements spaced from the walls of the cavity. Thus, the driving and sensing grids can still be maintained an optimum distance from the vibrating diaphragm (for driving force and displacement sensitivity, respectively) but the diaphragm will "see" through the porous grids and couple to the enlarged gas chambers which have damping characteristics smaller than those of the prior art. Further, in accordance with certain preferred embodiments of the invention, the geometry of the grids and diaphragm are selected so that the sensing grid will be insensitive to unwanted modes of diaphragm motion.

The present invention in its simplest form is shown semi-diagrammatically in FIG. 1 and the transducer element itself is shown in detail (but not to scale) in FIGS. 2 and 3. In FIG. 1 the transducer is generally designated 11 and has a cylindrical metal outer shell 13 and insulated end walls 15 and 17. Metallic damping plates, generally designated 19 are employed, each of which has a cylindrical outer rim 21 and a center post 23. Mounted on the damping plates are a driving grid 24 and a sensing grid 25. Mounted at the center of the transducer is a metallic diaphragm 27. The driving grid 24 and the sensing grid 25 are spot welded under tension to the rim and center posts of the damping plates. A gas passage 29 is provided for introducing the gas to be measured into the cavity thus formed.

Various methods can be used for driving the diaphragm and for sensing the movement of the diaphragm. Therefore, the scheme shown in FIG.1 is merely illustrative of the one technique which can be used in utilizing the transducer forming the crux of the present invention. The driving grid 24 is energized by a constant DC voltage and by a variable or AC voltage for driving the diaphragm 27 electrostatically, i.e. by its capacitive linking between the driving plate and the diaphragm. A source of DC current such as a battery 31 is connected to the center post 23 while the other terminal of the battery goes to the arm of potentiometer 33. One leg of the potentiometer as well as the case 13 of the transducer are grounded, as shown. A variable frequency oscillator generally designated 35 is connected to the outer legs of the potentiometer 33 so that an AC current, variable both as to frequency and voltage with an additional DC component introduced by the battery is applied to the driving plate 24. The variable frequency is preferably selected to drive the diaphragm 27 at its resonant frequency and the resonant frequency will, in turn, be a measure of the density or pressure of the gas within the transducer. Alternately, the diaphragm may be caused to drive at a constant amplitude. When this is done, the amount of input power consumed (to drive the diaphragm) will be a function of the density or pressure of the gas.

A displacement indicator 37 is provided to detect when the diaphragm is vibrating at its resonant frequency. The sensing grid 25 is connected to displacement indicator 37 and the displacement indicator provides a means for determining when the diaphragm amplitude is constant. A frequency indicator 39 is also coupled into the circuit and this acts as an indicator allowing the selection of the resonant frequency for optimum operation. The open loop circuitry described is the simplest possible and is given only for purpose of illustration and more sophisticated circuitry such as the closed loop circuit shown in FIG. 5 of U.S. Pat. No. 3,295,360 would preferably be employed.

As can be seen, the volume of gas confined within the transducer 11 is much larger than that confined between the driving and sensing grids and the diaphragm. In the transducer shown in U.S. Pat. No. 3,295,360, the outer walls of the transducer form the forcing and sensing plates so that all of the gas within the cavity is worked upon by the vibrating diaphragm. Since the forcing plate is very close to the diaphragm and the gas chamber is small, a substantial amount of work must be done against the gas being measured. The result of this is that the damping increases with increasing pressure more rapidly than is desirable at higher pressures so that because of the low effective Q, the sensor ceases to function as a simple mechanical resonant system and is incapable of measuring high pressures. These problems of the prior art have been minimized by the transducer illustrated in FIGS. 1 through 3 as well as the modifications shown in FIGS. 4 through 7, to significantly improve the performance of the system. Thus, instead of being able to measure only a relatively low pressure, the device of the present invention is capable of measuring a wide range of pressures. The forcing and sensing grids are maintained at close proximities to the vibrating diaphragm to achieve optimum driving force and displacement sensitivity, respectively. The plates supporting the grids are moved farther back from the diaphragm so as to create enlarged gas chambers. Since the forcing and sensing grids are perforated, the diaphragm works on all the gas in each chamber and a reduced damping characteristic is achieved. Accordingly, higher pressures can be measured. The transducer geometry can thus be advantageously altered without sacrificing effective driving force or displacement sensitivity.

The structure shown in FIGS. 1 through 3 is more or less diagrammatic and a practical embodiment of the transducer is shown in FIG. 4. Here the outer cylindrical shell of the cavity is made in two pieces 41 and 43 to expedite fabrication. Discs of ceramic 45 and 47 are employed to support the damping plates 49 and 51. The damping plates have a cylindrical rim 53 and a center post 55. The grids 57 are welded under tension to the center post and rim. The grids 57 each have a solid area representing about 40% of their gross area. Suitable electrical connectors 59 are attached to the center post in the usual manner. A gas passage 61 provides for the entrance of the gas to be measured into the cavity thus formed.

In a preferred embodiment of the invention, the shell and damping plates were made of a nickel-iron alloy and the insulating parts were made of an $Al_2O_3$ ceramic material. The grids were made of 0.0001 inch thick nickel having approximately 40% open area. The grids were positioned approximately 0.003 inch from the diaphragm. The center post of the damping plate was 0.012 inch high. By making the parts of metals and ceramics capable of withstanding high temperatures, the transducer can be heat sterilized, as is required for planetary probes.

Figure 5:
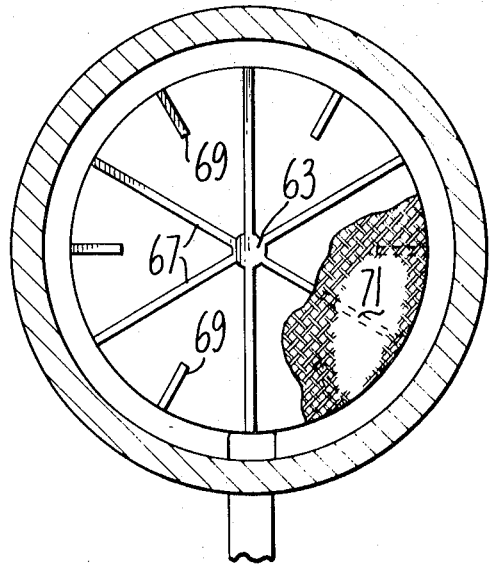
FIG. 5 is a section through a transducer wherein radical spokes support the grids.
Figure 6:
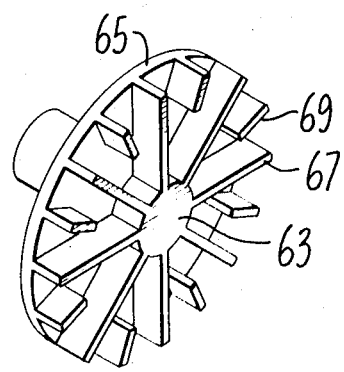
FIG. 6 is a perspective view of a damping plate of the transducer shown in FIG. 5.

FIGS. 5 and 6 illustrate an embodiment of the invention wherein the geometry of the cavity has been altered by providing a spokes-like structure to support the driving and sensing grids. Here the damping plate 65 is provided with a center post 63 which has a number of radial spokes 67 extending from the center post 63 to the edge of the damping plate 65, alternating with a series of short spokes 69 which extend only part way towards the center post 63. The grid 71, which in this case is a nickel screen, is spot welded to the center post and the spokes. Not only does this damping plate embodiment provide more support for the grid, it is less sensitive to gas composition than the damping plate depicted in FIG. 2.

In some applications of the invention, for example, when it is used as an electrometer, it is desirable to suppress the effects of certain diaphragm harmonics. This may be achieved by controlling the ratio of the radius of the damping plate with respect to the radius of the diaphragm.

The sensing area radius for higher mode suppression is determined from the following equation.

$$R_p = \frac{Y_{n-1}A}{X_n}$$

$$n = 2, 3, 4, 5 \ldots$$

where $R_p$ is the damping plate radius, A is the diaphragm radius, $X_n$ is the $n$th root of the equation $J_0(X)=0$ and $Y_{n-1}$ is the corresponding root of the equation $J_1(Y)=0$. $J_0$ and $J_1$ denote Bessel functions of the zero and first order respectively. For the specific case where it is desired to suppress the $J_{02}$ mode, (second harmonic) $X_2=5.520$, $Y_1=3.832$ and it follows from the equation above that $R_p \simeq .695A$. Thus, if the radius of each damping plate 19 (FIG. 2) were 0.695 times as large as the radius of diaphragm 27, the second harmonic of vibration of diaphragm 27 would not be sensed at the sensing electrode.

Figure 7:
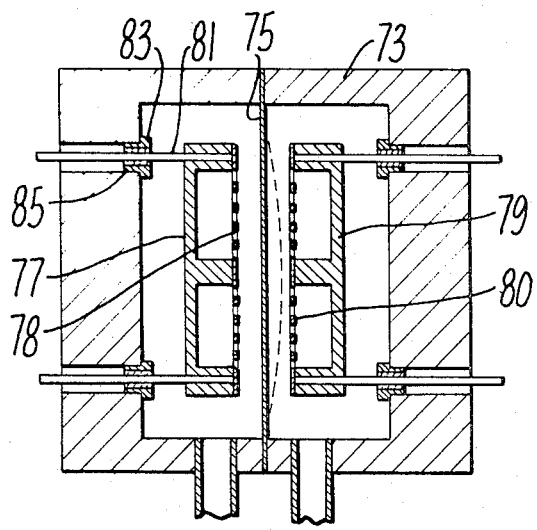
FIG. 7 is a sectional view of another embodiment of the invention wherein small seals are utilized.

In FIG. 7 still another embodiment of the invention is shown wherein the damping plates do not form the outer walls of the cavity but are mounted in a much larger cavity. Here a cavity is formed by means of the chamber 73 which may or may not be made of an insulating material. A diaphragm 75 is mounted in the center of the cavity thus formed while the damping plate 77 is mounted on one side of the diaphragm and a second damping plate 79 is mounted on the other side of the diaphragm but spaced substantially from the walls of the cavity. The plates 77 and 79 are supported on small rods 81. Although the two rods have been shown for each of the plates, in this figure it is preferred to employ three rods for greater stability of the structure. Collars 83 are silver-soldered to the container 73 and a glass-to-metal seal is formed at 85. The grids 78 and 80 are spot welded to the rim and center post of the damping plates as previously described. The damping plate of FIG. 6 (with the spoke-like structure), minus the centrally-located post on the backside which serves as an electrode, may be substituted for damping plates 77 and 79. Of course, the plates with the spoke-like structure will likewise be supported by peripherally-located rods 81. This structure has two outstanding advantages—improved temperature operating range and freedom from undesirable acoustic modes.

In the embodiment of FIG. 4, the ceramic discs 45 and 47 comprise a substantial portion of the transducer. It is very difficult to obtain ceramic and metal materials for this embodiment which will have uniform temperature expansion characteristics over a wide range. In the embodiment of FIG. 7, the complete transducer can be fabricated from the same material (except for the very small amount of glass used in making the seals) and hence thermal expansion problems are greatly minimized. A further advantage of this embodiment is that the volume behind the damping plates modifies the acoustic properties of the gas chamber so as to shift any acoustic resonances to a region that will not interfere with the vibration of the diaphragm. Accordingly, when measuring high gas pressures, it is gas stiffness acting on the diaphragm, not undesirable acoustic chamber resonances. Thus, the pressure measurement range, at the high end, is significantly increased. Tests of this small-seal embodiment transducer indicate that it is ideally suited for making frequency vs. pressure measurements.

Figure 8:
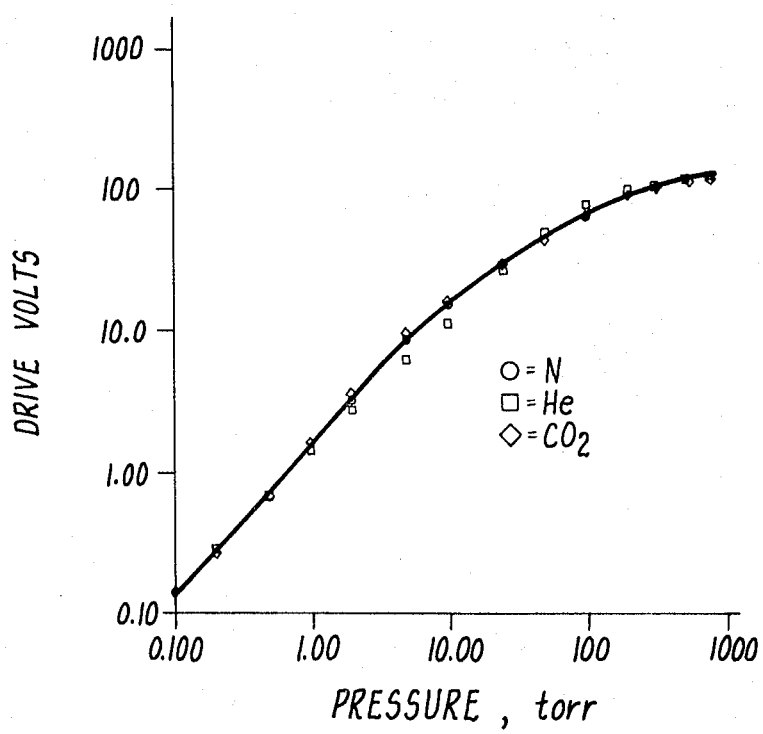
FIG. 8 is a graph showing the relationship between pressure and drive voltage for three different gases, namely nitrogen, helium and carbon dioxide.

FIG. 8 is a graph of drive voltage as a function of pressure for the embodiment of FIG. 6. Three different gases were tested-namely nitrogen, helium and carbon dioxide. It will be seen from the figure that the structure yields numerical values which are almost completely independent of the composition of the gas.

Figure 9:
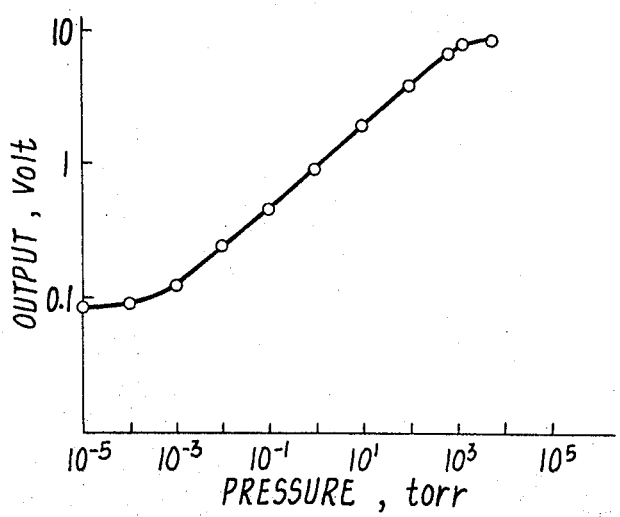
FIG. 9 is a graph showing the relationship between output voltage and pressure ranging from $10^{-5}$ to $10^4$ torr.

In FIG. 9, a graph is shown wherein the output voltage is compared with pressure within the transducer. It will be seen that the device of the present invention is useful for measuring pressures from $10^{-5}$ to $10^4$ torr. Further, it will be seen that that portion of the curve lying between $10^{-3}$ and $10^3$ forms a substantially straight line. Thus pressure can be read through a large range as a direct function of the output voltage.

Many variations can be made from the exact structure shown without departing from the spirit of this invention. By utilizing the perforated sensing and forcing grids, the loading normally associated with the gas and the resulting apparent stiffness of the diaphragm can be greatly minimized. Although a diaphragm has been shown at the center of the device, other vibrating members such as ribbons, plates and strings might be employed as the dynamic element. Further, it is not necessary that the vibrating element be vibrated at its natural resonant frequency but the diaphragm or the like can be forced to vibrate as some other frequency.

Although the device has been described in terms of a pressure transducer, the principle of the invention can be applied to any device wherein a diaphragm motion is sensed by a variation of capacitance such as dynamic capacitor electrometers and mechanical filters. Further, it is not necessary that the diaphragm be driven electrostatically in a steady state of motion since the diaphragm may be driven in other manners such as by shock, vibration or acceleration.

What is claimed is:

1. A device wherein a vibrating member is driven electrostatically by a driving member and the motion of the vibrating member is sensed by a variation in capacitance by a sensing member comprising in combination:
   (a) walls defining a hollow cavity,
   (b) a flexible vibrating member contained within the cavity,
   (c) a driving member mounted within said cavity adjacent to said vibrating member,
   (d) a sensing member mounted within said cavity spaced from said vibrating member,
   (e) said driving member and said sensing member each comprising a conductive grid having at least 40% open area, and
   (f) wherein the driving and the sensing members are supported on damping plates, said damping plates having a cylindrical rim and a center post with the driving and sensing members affixed to said rim and center post.

2. The structure of claim 1 wherein the damping members comprise circular plates having a series of spokes therein wherein the driving and sensing members are affixed to said spokes.

3. The structure of claim 2 wherein the damping plates have an alternate series of short and long spokes wherein the short spokes extend inwardly from the periphery of the damping member.

4. The structure of claim 1 wherein the vibrating member is a disc and the damping members are discs spaced on each side of the vibrating member, the diameter of the damping members being about 0.695 times as large as the diameter of the vibrating member.

References Cited
UNITED STATES PATENTS

| | | | |
|---|---|---|---|
| 1,648,689 | 11/1927 | Hund | 317—246 UX |
| 2,493,819 | 1/1950 | Harry | 179—106 X |

DONALD O. WOODIEL, Primary Examiner

U.S. Cl. X.R.

73—406